United States Patent [19]

Kohda et al.

[11] Patent Number: 4,539,137

[45] Date of Patent: Sep. 3, 1985

[54] PROCESS FOR THE PREPARATION OF PHOSPHOR

[75] Inventors: Katsuhiro Kohda; Kenji Takahashi, both of Kaisei, Japan

[73] Assignee: Fuji Photo Film Co., Ltd., Japan

[21] Appl. No.: 661,615

[22] Filed: Oct. 17, 1984

[30] Foreign Application Priority Data

Oct. 24, 1983 [JP] Japan .................. 58-198757
Nov. 7, 1983 [JP] Japan .................. 58-208729
Nov. 7, 1983 [JP] Japan .................. 58-208730

[51] Int. Cl.$^3$ .......................................... C09K 11/475
[52] U.S. Cl. ..................... 252/301.4 H; 252/301.4 F; 252/301.6 R; 252/301.6 F
[58] Field of Search ................ 252/301.4 H, 301.4 F, 252/301.6 F, 301.6 R

[56] References Cited

U.S. PATENT DOCUMENTS

| | | | |
|---|---|---|---|
| 2,409,174 | 10/1946 | Dietz | 252/301.4 H X |
| 3,904,546 | 9/1975 | Mattis et al. | 252/301.4 H X |
| 4,029,851 | 6/1977 | Degenhardt | 252/301.4 H X |
| 4,208,470 | 6/1980 | Rabatin | 252/301.4 H X |
| 4,239,968 | 12/1980 | Kotera et al. | 252/301.4 H X |
| 4,311,487 | 1/1982 | Luckey et al. | 252/301.4 H X |

FOREIGN PATENT DOCUMENTS

| | | | |
|---|---|---|---|
| 22743 | 2/1962 | Fed. Rep. of Germany ... | 252/301.4 H |
| 2329396 | 2/1975 | Fed. Rep. of Germany ... | 252/301.4 H |

*Primary Examiner*—Jack Cooper
*Attorney, Agent, or Firm*—Murray, Whisenhunt and Ferguson

[57] ABSTRACT

A process for the preparation of a cerium activated rare earth oxyhalide phosphor having the following formula:

$$LnOX:xCe$$

in which Ln is at least one rare earth element selected from the group consisting of Y, La, Gd and Lu; X is at least one halogen selected from the group consisting of Cl, Br and I; and x is a number satisfying the condition of $0<x\leqq0.1$, which comprises:
adding to a mixture of starting materials for the phosphor or a heat-treated product of said mixture at least one compound selected from the group consisting of tetrafluoroboric acid compounds, hexafluorosilicic acid compounds and metal fluorides in an amount of not more than 100% by weight per the amount of said mixture of starting materials or said heat-treated product thereof to mix them; and
firing the so obtained mixture.

22 Claims, 5 Drawing Figures

PROCESS FOR THE PREPARATION OF PHOSPHOR

BACKGROUND OF THE INVENTION

1. Field of the Invention

The present invention relates to a process for the preparation of a phosphor, and more particularly, to a process for the preparation of a cerium activated rare earth oxyhalide phosphor.

2. Description of the Prior Art

It has been heretofore known that a cerium activated rare earth oxyhalide phosphor having the following formula:

$$LnOX:xCe$$

in which Ln is at least one rare earth element selected from the group consisting of Y, La, Gd and Lu; X is at least one halogen selected from the group consisting of Cl, Br and I; and x is a number satisfying the condition of $0 < x \leq 0.1$, can be employed as a phosphor for a radiographic intensifying screen, since the phosphor gives an emission (spontaneous emission) in the blue light region with the maximum at the wavelength of approx. 440 nm when excited with a radiation such as X-rays. Recently, it has been discovered that said cerium activated rare earth oxyhalide phosphor emits light in the blue region when excited with an electromagnetic wave having a wavelength within the region of 450–900 nm after exposure to a radiation such as X-rays, that is, the phosphor gives stimulated emission. Because of the stimulability thereof, the cerium activated rare earth oxyhalide phosphor has been paid much attention and investigated as a phosphor for a radiation image storage panel employable in a radiation image recording and reproducing method utiilizing a stimulable phosphor, as described in Japanese Patent Provisional Publication No. 55(1980)-12144.

When a radiation image storage panel containing a stimulable phosphor is employed in radiography for the medical diagnosis, it is particularly desired that the sensitivity of the panel to a radiation is made as high as possible to reduce the exposure dose for patient and to facilitate the procedure for converting the stimulated emission to electric signals. Accordingly, it is desired to make the luminance of stimulated emission of the phosphor employed for the panel as high as possible, and to develop an art for enhancing the luminance of stimulated emission of the phosphor as high as possible. As for the above-mentioned cerium activated rare earth oxyhalide phosphor, the same is desired.

SUMMARY OF THE INVENTION

An object of the present invention is to provide a process for the preparation of a cerium activated rare earth oxyhalide phosphor which exhibits stimulated emission of high luminance upon excitation with an electromagnetic wave having a wavelength within the region of 450–900 nm after exposure to a radiation such as X-rays.

The object is accomplished by the process for the preparation of a phosphor in accordance with the present invention, that is, a process for the preparation of a cerium activated rare earth oxyhalide phosphor having the following formula:

$$LnOX:xCe$$

in which Ln is at least one rare earth element selected from the group consisting of Y, La, Gd and Lu; X is at least one halogen selected from the group consisting of Cl, Br and I; and x is a number satisfying the condition of $0 < x \leq 0.1$, which comprises:

adding to a mixture of starting materials for the phosphor or a heat-treated product of said mixture at least one compound selected from the group consisting of tetrafluoroboric acid compounds, hexafluorosilicic acid compounds and metal fluorides in an amount of not more than 100% by weight per the amount of said mixture or said heat-treated product thereof to mix them; and firing the so obtained mixture.

The present inventors have found that the cerium activated rare earth oxyhalide phosphor is enhanced in the luminance of stimulated emission by adding to a mixture of starting materials for the preparation thereof or a heat-treated product of said mixture at least one compound selected from the group consisting of tetrafluoroboric acid compounds, hexafluorosilicic acid compounds and metal fluorides in advance of the firing procedure.

DETAILED DESCRIPTION OF THE INVENTION

Figure 1:
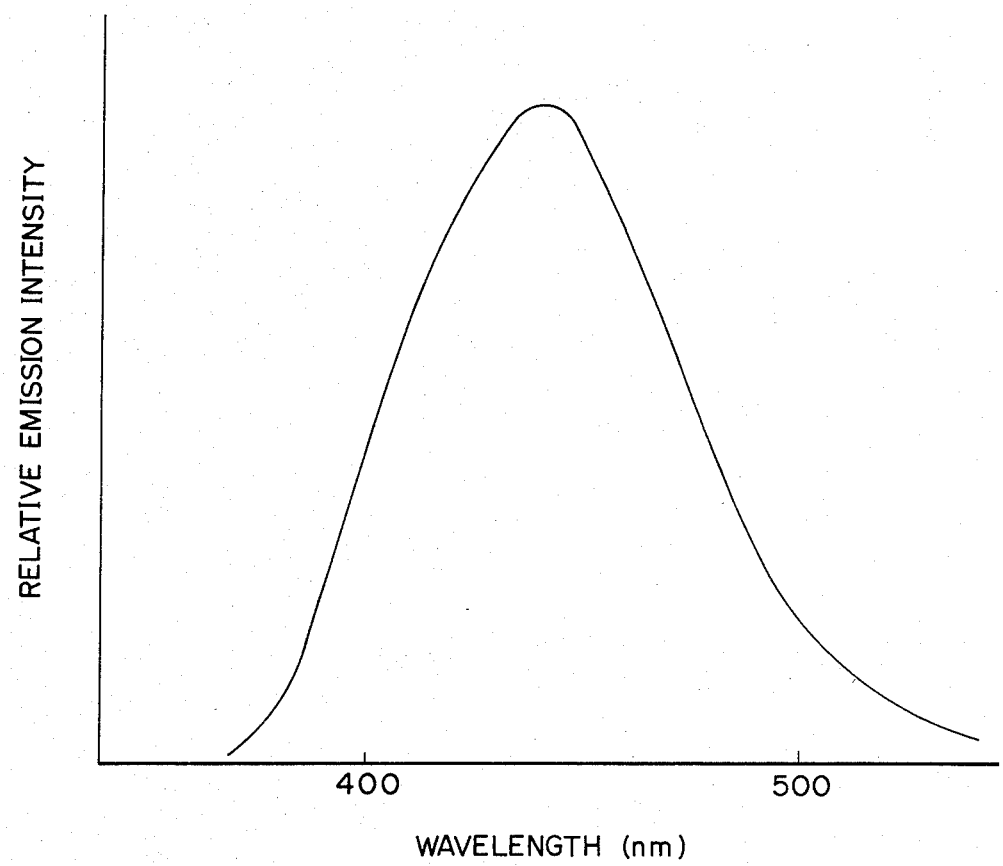
FIG. 1 shows a stimulated emission spectrum of a cerium activated lanthanum oxybromide phosphor prepared according to the present invention, which is given upon excitation with an Ar ion laser beam (wavelength: 514.5 nm) after exposure to X-rays at 80 KVp.

The process for the preparation of a cerium activated rare earth oxyhalide phosphor of the present invention will be described below.

As the starting materials for the preparation of the phosphor, the following materials can be employed in the process of the invention:

(1) at least one rare earth oxide selected from the group consisting of $Y_2O_3$, $La_2O_3$, $Gd_2O_3$ and $Lu_2O_3$;

(2) at least one halogen donator capable of donating at least one halogen selected from the group consisting of Cl, Br and I;

(3) at least one cerium compound (cerium halide, cerium oxide, etc.); and (4) at least one compound selected from the group consisting of tetrafluoroboric acid compounds, hexafluorosilicic acid compounds and metal fluorides, as an additive.

Examples of the above-mentioned halogen donator (2) include ammonium halide ($NH_4X$), hydrogen halide (HX) in the form of aqueous solution and gas, and rare earth halide ($LnX_3$; in which X is any one of Cl, Br and I; and Ln is any one of Y, La, Gd and Lu). In the case of using the rare earth halide as a halogen donator, the halogen donator is to donate a portion or whole of the rare earth element which serves as a host component of the phosphor as well as the halogen also serving as the host component thereof.

In the first place, the above-mentioned starting materials (1) to (3), (1) and (3), or (2) and (3) are employed in an appropriate amount to prepare a mixture or a heat-treated product thereof. The mixture of starting materials for the phosphor or the heat-treated product thereof is prepared, for instance, by any one of the following procedure:

(I) in the case of using ammonium halide as the halogen donator (2), (i) simply mixing the starting materials (1) to (3); or (ii) heating the mixture obtained in the procedure (i) at a temperature within the range of 300°–500° C. for several hours;

(II) in the case of using an aqueous solution of hydrogen halide as the halogen donator (2), (iii) processing the rare earth oxide (1) with an aqueous solution of hydrogen halide to produce a rare earth halide represented by the formula $LnX_3$ in the form of a solution, adding to the $LnX_3$ solution the cerium compound (3) and the rare earth oxide (1), and drying them to obtain a dry mixture comprising $LnX_3$, a rare earth oxide and a cerium compound; or (iv) heating the mixture obtained in the procedure (iii) at a temperature within the range of 300°–500° C. for several hours;

(III) in the case of using a hydrogen halide gas as the halogen donator (2), (v) simply mixing the strating materials (1) and (3) (in this case, the hydrogen halide gas is employed for providing a firing atmosphere as described hereinafter); or (vi) mixing the starting materials (1) and (3) and heating the obtained mixture at a temperature within the range of 300°–500° C. for several hours in a hydrogen halide gas atmosphere;

(IV) in the case of using a rare earth halide as the halogen donator (2), (vii) simply mixing the starting materials (1) to (3); or (viii) heating the mixture obtained in the procedure (vii) at a temperature within the range of 300°–500° C. for several hours; or (ix) simply mixing the strating materials (2) and (3) (in this case, an oxidizing atmosphere is employed for a firing atmosphere as described hereinafter); or (x) heating the mixture obtained in the procedure (ix) at a temperature within the range of 300°–500° C. for several hours.

In any procedures, the mixing procedure is carried out by means of a conventional mixing apparatus such as a variety of mixers, a V-type blender, a ball mill and a rod mill.

Among the above-described procedures (i) to (x), there are preferably employed the procedures (i) and (iii), and the procedures (ii), (iv), (vi), (viii) and (x) which include a heat-treating procedure. Particularly preferred are the procedures (i), (ii), (iii) and (iv) employing ammonium halide or an aqueous solution of hydrogen halide as the halogen donator.

In the preparation of a mixture of starting materials for the phosphor or a heat-treated product thereof, the rare earth oxide (1) and the cerium compound (3) are employed in the stoichiometric ratio corresponding to the the above-mentioned formula of the phosphor. Likewise, when the rare earth halide is employed as the halogen donator (2), the rare earth halide is employed in the stoichiometric ratio corresponding to the above-mentioned formula. Otherwise, in the case of using the ammonium halide, hydrogen halide solution or hydrogen halide gas, they are employed in a stoichiometrically excessive amount. The rare earth oxide (1) may be replaced with a rare earth compound such as oxalate or carbonate which can be easily converted into the rare earth oxide (1) at a high temperature.

In the phosphor having the formula LnOX:xCe prepared according to the process of the present invention, Ln preferably is La and/or Gd, and X is preferably Br, from the viewpoint of enhancement in the luminance of stimulated emission given upon excitation with an electromagnetic wave in the wavelength region of 450–900 nm after exposure to a radiation such as X-rays. Further, x in the formula is preferably a number satisfying the condition of $10^{-6} \leq x \leq 10^{-1}$, and more preferably $10^{-5} \leq x \leq 5 \times 10^{-2}$.

To the mixture of starting materials for the phosphor or the heat-treated product thereof obtained as described above is added the compound (4), namely at least one compound selected from the group consisting of tetrafluoroboric acid compounds, hexafluorosilicic acid compounds and metal fluorides in an amount of not more than 100% by weight based on the amount of said mixture or heat-treated product thereof, and mixed therewith.

In the case of adding a tetrafluoroboric acid compound or a hexafluorosilicic acid compound to the mixture of starting materials for the phosphor or the heat-treated product thereof, the amount thereof preferably ranges from 0.1 to 30% by weight per the amount of the mixture of starting materials or the heat-treated product thereof, and particularly preferably from 0.3 to 5% by weight. Otherwise, in the case of using a metal fluoride, the amount thereof ranges from 0.2 to 30% by weight per the amount of the mixture or starting materials or the heat-treated product thereof, and particularly preferably from 0.5 to 20% by weight.

Examples of the tetrafluoroboric acid compound employable in the invention include alkali metal salts such as $NaBF_4$ and $KBF_4$; $NH_4BF_4$; and alkaline earth metal salts such as $Mg(BF_4)_2$, $Ca(BF_4)_2$, $Sr(BF_4)_2$ and $Ba(BF_4)_2$. Among these tetrafluoroboric acid compounds, preferred are $NaBF_4$, $KBF_4$ and $NH_4BF_4$, and particularly preferred is $NaBF_4$.

Examples of the hexafluorosilicic acid compound employable in the invention include alkali metal salts such as $Li_2SiF_6$, $Na_2SiF_6$, $K_2SiF_6$, $Rb_2SiF_6$ and $Cs_2SiF_6$; $(NH_4)_2SiF_6$; and divalent metal salts such as $MgSiF_6$, $CaSiF_6$, $BaSiF_6$, $CuSiF_6$, $ZnSiF_6$ and $PbSiF_6$. Among these hexafluorosilicic acid compounds, preferred are $Na_2SiF_6$, $MgSiF_6$, $CaSiF_6$ and $BaSiF_6$, and particularly preferred are $Na_2SiF_6$ and $MgSiF_6$.

As the metal fluoride, a monovalent metal fluoride and a divalent metal fluoride can be preferably employed in the invention. Examples of the metal fluoride include alkali metal fluorides such as LiF, NaF, KF, RbF and CsF; alkaline earth metal fluorides such as $MgF_2$, $CaF_2$, $SrF_2$ and $BaF_2$; and other divalent metal fluorides $CuF_2$, $ZnF_2$, $MnF_2$ and $PbF_2$. Among these metal fluorides, preferred are LiF, NaF, $MgF_2$, $CaF_2$, $SrF_2$, $BaF_2$, $ZnF_2$ and $PbF_2$, and particularly preferred are LiF and $MgF_2$.

Then, the mixture of the starting materials for the phosphor or the heat-treated product thereof into which the above-mentioned tetrafluoroboric acid compound, hexafluorosilicic acid compound and/or metal fluoride is incorporated, is placed in a heat-resistant container such as a quartz boat, an alumina crucible or a quartz crucible and fired in an electric furnace. The temperature for the firing suitably ranges from 900° to 1,500° C., and preferably ranges from 1,050° to 1,200° C. The firing period is determined depending upon the amount of the mixture of the starting materials or the heat-treated product thereof charged in the heat-resistant container, the firing temperature, etc. Generally, the firing period ranges from 0.3 to 5 hours, and preferably ranges from 1 to 3 hours.

As the firing atmosphere, there can be employed a weak reducing atmosphere such as a nitrogen gas atmosphere containing a small amount of hydrogen gas or a carbon dioxide gas atmosphere containing carbon monoxide gas, and an inert atmosphere such as a nitrogen gas atmosphere and an argon gas atmosphere. In the case that the mixture of starting materials for the phosphor is prepared through the aforementioned procedure (v), the hydrogen halide gas is employed for the firing atmosphere singly or in combination with the above-mentioned weak reducing atmosphere or inert atmosphere. In the case that the mixture of starting materials is prepared through the aforementioned procedure (ix), an oxidizing atmosphere such as air is employed for the firing atmosphere, and in the firing stage, $LnX_3$ contained in the mixture is converted into LnOX by the oxidizing atmosphere.

The product obtained by the firing under the above-mentioned conditions is taken out of the furnace, allowed to stand for cooling and pulverized. The pulverized product may be again placed in the heat-resistant container and fired in the electric furnace. For conducting the second firing, there can be employed the above-mentioned weak reducing atmosphere or inert atmosphere.

After the firing is complete, the fired product is finely pulverized to obtain a powdery phosphor of the invention. The powdery phosphor thus obtained may be processed in a conventional manner involving a variety of procedures for the preparation of phosphors such as a washing procedure, a drying procedure and a sieving procedure.

The phosphor of the present invention prepared in accordance with the above-described process is a cerium activated rare earth oxyhalide phosphor having the following formula:

LnOX:xCe in which Ln is at least one rare earth element selected from the group consisting of Y, La, Gd and Lu; X is at least one halogen selected from the group consisting of Cl, Br and I; and x is a number satisfying the condition of $0 < x \leq 0.1$.

Figure 2:
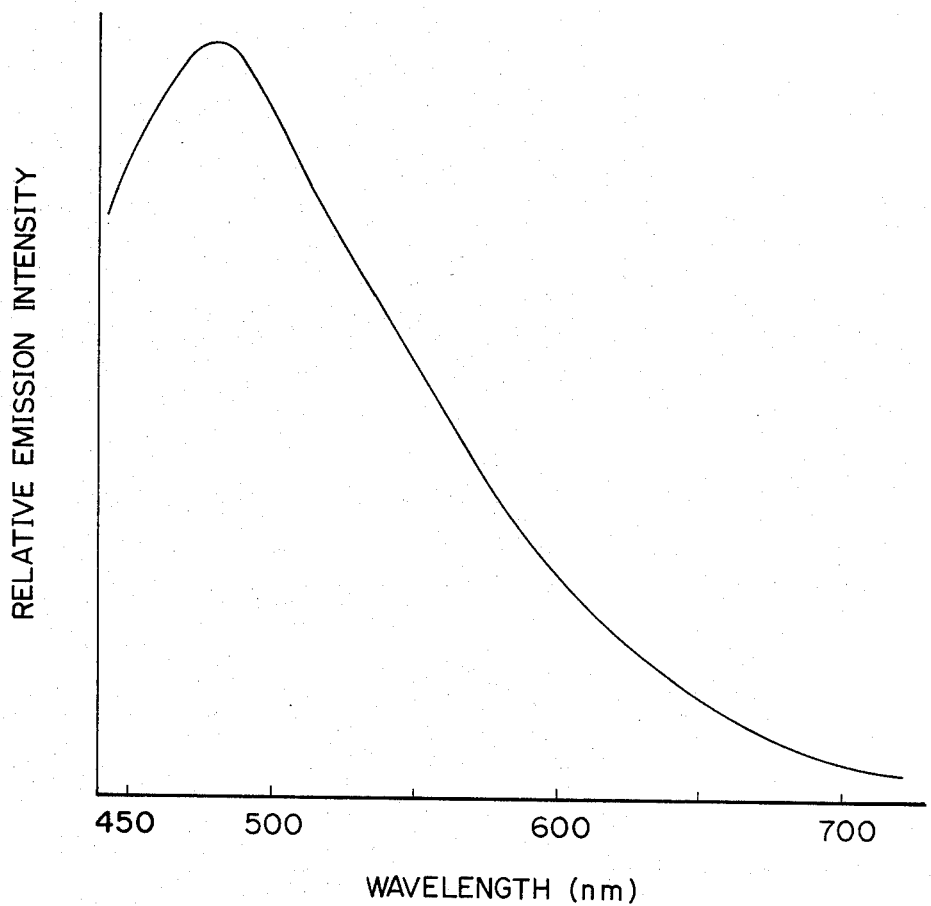
FIG. 2 shows a stimulation spectrum of the cerium activated lanthanum oxybromide phosphor prepared according to the present invention in the wavelength of 440 nm, which is given upon excitation with light whose wavelength is varied after exposure to X-rays at 80 KVp.

A stimulated emission spectrum and a stimulation spectrum of a cerium activated lanthanum oxybromide phosphor obtained by adding 2% by weight of sodium tetrafluoroborate are shown in FIGS. 1 and 2, respectively, said phosphor being an example of the phosphors prepared according to the process of the present invention.

FIG. 1 illustrates a stimulated emission spectrum given when exciting the cerium activated lanthanum oxybromide phosphor with an Ar ion laser beam (wavelength: 514.5 nm) after exposure to X-rays at 80 KVp.

FIG. 2 illustrates a variation of intensity of stimulated emission (i.e., a stimulation spectrum) at the wavelength of 440 nm given when exciting the cerium activated lanthanum oxybromide phosphor with light whose wavelength is varied after exposure to X-rays at 80 KVp.

As is evident from FIGS. 1 and 2, the cerium activated lanthanum oxybromide phosphor prepared by the process of the present invention gives almost the same stimulated emission spectrum and stimulation spectrum as those of a cerium activated lanthanum oxybromide phosphor prepared by the conventional process.

It has been confirmed that other cerium activated rare earth oxyhalide phosphors prepared by the process of the present invention show almost the same spectrums as illustrated above.

As described hereinbefore, the phosphor obtained by the process of the invention is remarkably enhanced in the luminance of stimulated emission given upon excitation with an electromagnetic wave having a wavelength within the region of 450–900 nm (stimulating rays) after exposure to a radiation such as X-rays, as compared with the cerium activated rare earth oxyhalide phosphor obtained by the conventional process.

The cerium activated rare earth oxyhalide phosphor has another advantage that the phosphor has a shorter life time of stimulated emission than that of a divalent europium activated alkaline earth metal fluorohalide phosphor which is known as the phosphor employable in a radiation image storage panel, because the cerium serves as activator. When the phosphor is employed in a radiation image storage panel, the resulting panel is prominently improved in the response upon exposure to stimulating rays after exposure to a radiation.

Further, it is possible to use a laser having a high output power such as an Ar ion laser as stimulating rays, because the cerium activated rare earth oxyhalide phosphor shows the peak of stimulation spectrum at such short wavelength as approx. 480 nm. For this reason, the radiation image storage panel employing said phosphor can be read out on the energy-stored image at high speed.

Accordingly, the cerium activated rare earth oxyhalide phosphor obtained by the process of the present invention is very useful as a phosphor for a radiation image storage panel from the viewpoint of the abovedescribed two advantages as well as of the remarkable enhancement in the luminance of stimulated emission.

The present invention will be illustrated by the following examples, but these examples by no means restrict the invention.

EXAMPLE 1

In a distilled water, 10.0 g. of lanthanum oxide ($La_2O_3$) was dispersed, and an aqueous solution of hydrogen bromide (HBr, 47% by weight) at the same equivalent as lanthanum oxide was added to the dispersion to produce a lanthanum bromide solution ($LaBr_3$). To the resulting solution was successively added 40 mg. of cerium bromide ($CeBr_3.5H_2O$) and 20.0 g. of lanthanum oxide ($La_2O_3$) to mix therewith, followed by drying. The dry product was heated at 500° C. for 2 hours to obtain a heat-treated product of the mixture of the starting materials for the preparation of a phosphor.

To 20.0 g. of the heat-treated product was then added 0.41 g. (2% by weight) of sodium tetrafluoroborate ($NaBF_4$), and they were mixed to obtain a homogeneous mixture.

Thus obtained mixture was placed in an alumina crucible, which was, in turn, placed in a high-temperature electric furnace. The mixture was fired at 1,100° C. for 1.5 hours under a carbon dioxide atmosphere containing carbon monoxide. After the firing was complete, a phosphor compound was obtained in the form of well grown crystals. The phosphor compound was thoroughly washed with methanol and then dried to obtain a cerium activated lanthanum oxybromide phosphor.

Further, the same procedure as described above was repeated except that the amount of sodium tetrafluoroborate to be added was varied within the range of 0.1–100% by weight to the amount of the heat-treated product, to obtain a variety of cerium activated lanthanum oxybromide phosphors.

COMPARISON EXAMPLE 1

The procedure of Example 1 was repeated except that no sodium tetrafluoroborate was added to the heat-treated product of the mixture of starting materials for the phosphor, to obtain a cerium activated lanthanum oxybromide phosphor (LaOBr: $4.62 \times 10^{-4}$ Ce).

The phosphors prepared in Example 1 and Comparison Example 1 were excited with an Ar ion laser beam (oscillation wavelength: 514.5 nm) after exposure to X-rays at 80 KVp, to measure the luminance of stimulated emission thereof.

Figure 3:
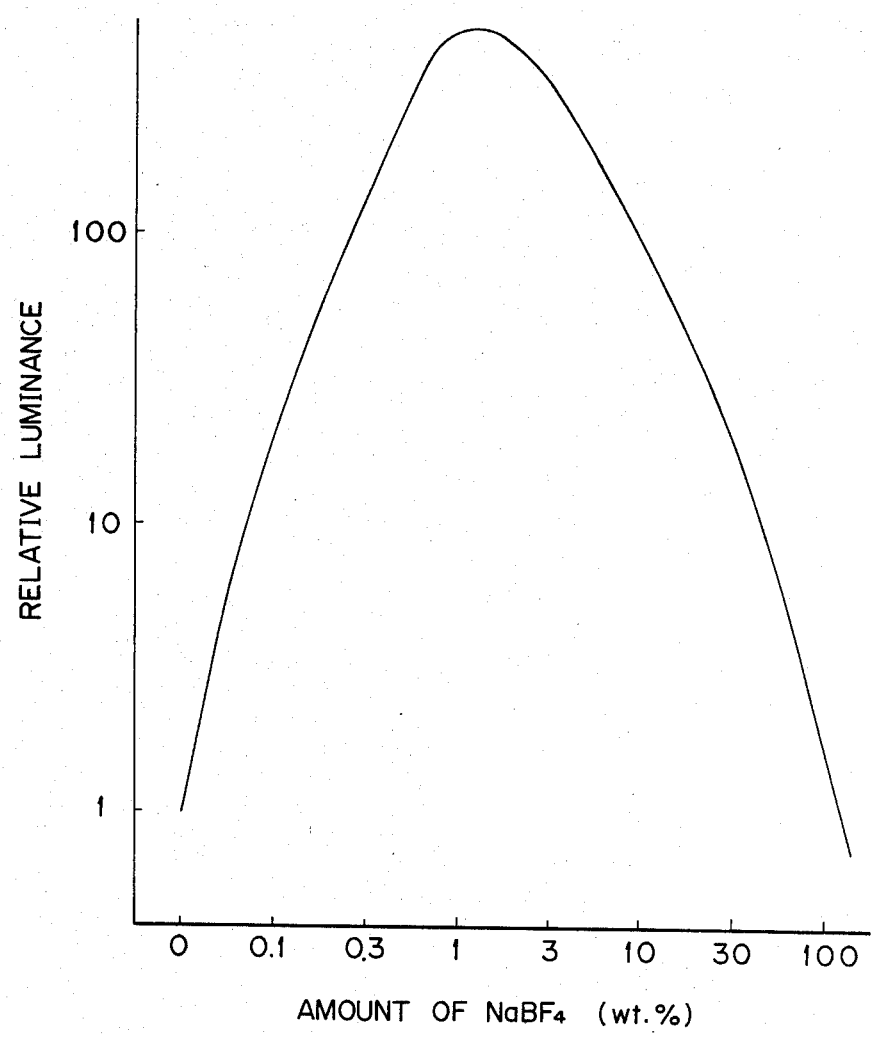
FIG. 3 shows a relationship between an amount of sodium tetrafluoroborate employed in the preparation of a cerium activated lanthanum oxybromide phosphor and luminance of stimulated emission of the obtained phosphor when excited with an Ar ion laser beam (wavelength: 514.5 nm) after exposure to X-rays at 80 KVp.

The results on the evaluation of the phosphors are set forth in Table 1 and FIG. 3.

TABLE 1

|  | $NaBF_4$ (wt. %) | Relative Luminance |
|---|---|---|
| Example 1 | 2 | 400 |
| Com. Example 1 | 0 | 1 |

FIG. 3 shows a relationship between an amount of sodium tetrafluoroborate employed in the preparation of the cerium activated lanthanum oxybromide phosphor and luminance of stimulated emission of the phosphor.

As is clear from the results set forth in Table 1 and the graph shown in FIG. 3, the phosphor prepared by the process of the present invention was remarkably enhanced in the luminance of stimulated emission as compared with the phosphor prepared by the conventional process not including the procedure of adding sodium tetrafluoroborate. Especially, the luminance of stimulated emission of the phosphor reached the level of several hundreds times as much as that of the conventional one when the sodium tetrafluoroborate is employed in the amount of 0.3–5% by weight of the heat-treated product.

EXAMPLE 2

The mixture of starting materials for the phosphor (dry product) of Example 1 was not heat-treated, and 0.41 g. (2% by weight) of sodium tetrafluoroborate ($NaBF_4$) was added to 20.0 g. of the mixture, to prepare a homogeneous mixture of starting materials for the preparation of a phosphor containing sodium tetrafluoroborate.

Thus obtained mixture was placed in an alumina crucible, which was, in turn, placed in a high-temperature electric furnace. The mixture was fired at 1,100° C. for 1.5 hours under a carbon dioxide atmosphere containing carbon monoxide. After the firing was complete, a phosphor compound was obtained in the form of a well growing crystal. The phosphor compound was thoroughly washed with methanol and then dried to obtain a cerium activated lanthanum oxybromide phosphor.

COMPARISON EXAMPLE 2

The procedure of Example 2 was repeated except that no sodium tetrafluoroborate was added to the mixture of starting materials for the phosphor, to obtain a cerium activated lanthanum oxybromide phosphor.

The phosphors prepared in Example 2 and Comparison Example 2 were excited with an Ar ion laser beam (wavelength: 514.5 nm) after exposure to X-rays at 80 KVp, to measure the luminance of stimulated emission thereof.

The results on the evaluation of the phosphors are set forth in Table 2.

TABLE 2

|  | $NaBF_4$ (wt. %) | Relative Luminance |
|---|---|---|
| Example 2 | 2 | 450 |
| Com. Example 2 | 0 | 1 |

As is clear from the results set forth in Table 2, the phosphor prepared by the process of the present invention is remarkably enhanced in the luminance of stimulated emission as compared with the phosphor prepared by the conventional process not including the procedure of adding sodium tetrafluoroborate.

EXAMPLE 3

100 g. of lanthanum oxide ($La_2O_3$), 60 g. of ammonium bromide ($NH_4Br$, 1.5 times equivalent of $La_2O_3$) and 0.40 g. of cerium bromide ($CeBr_3.5H_2O$) were mixed. The mixture was heated at 500° C. for 1 hour to prepare a heat-treated product of the mixture of starting materials for the preparation of a phosphor.

To 20.0 g. of the heat-treated product was added 0.41 g. (2% by weight) of potassium tetrafluoroborate ($KBF_4$), and they were mixed to obtain a homogeneous mixture.

Thus obtained mixture was placed in an alumina crucible, which was, in turn, placed in a high-temperature electric furnace. The mixture was fired at 1,100° C. for 1.5 hours under a carbon dioxide atmosphere containing carbon monoxide. After the firing was complete, a phosphor compound was obtained in the form of well grown crystals. The phosphor compound was thoroughly washed with methanol and then dried to obtain a cerium activated lanthanum oxybromide phosphor.

EXAMPLE 4

The procedure of Example 3 was repeated except that 0.41 g. (2% by weight) of ammonium tetrafluoroborate (NH$_4$BF$_4$) was added to 20.0 g. of the heat-treated product of the mixture of starting materials for the phosphor, to obtain a cerium activated lanthanum oxybromide phosphor.

COMPARISON EXAMPLE 3

The procedure of Example 3 was repeated except that no potassium tetrafluoroborate was added to the heat-treated product of the mixture of starting materials for the phosphor, to obtain a cerium activated lanthanum oxybromide phosphor.

The phosphors prepared in Examples 3 and 4 and Comparison Example 3 were excited with an Ar ion laser beam (wavelength: 514.5 nm) after exposure to X-rays at 80 KVp, to measure the luminance of stimulated emission thereof.

The results on the evaluation of the phosphors are set forth in Table 3.

TABLE 3

|  | Tetrafluoroboric Acid Compound | Relative Luminance |
| --- | --- | --- |
| Example 3 | KBF$_4$ | 365 |
| Example 4 | NH$_4$BF$_4$ | 345 |
| Com. Example 3 | — | 1 |

As is clear from the results set forth in Table 3, the phosphor prepared by the process of the present invention is remarkably enhanced in the luminance of stimulated emission as compared with the phosphor prepared by the conventional process not including the procedure of adding a tetrafluoroboric acid compound.

EXAMPLE 5

The procedure of Example 1 was repeated except that 0.41 g. (2% by weight) of sodium hexafluorosilicate (Na$_2$SiF$_4$) was added to 20.0 g. of the heat-treated product of the mixture of starting materials for the phosphor instead of sodium tetrafluoroborate, to obtain a cerium activated lanthanum oxybromide phosphor.

Further, the same procedure was repeated except that the amount of sodium hexafluorosilicate to be added was varied within the range of 0.1–100% by weight to the amount of the heat-treated product, to obtain a variety of cerium activated lanthanum oxybromide phosphors.

The phosphor prepared in Example 5, that is, the cerium activated lanthanum oxybromide phosphor obtained by adding 2% by weight of sodium hexafluorosilicate was excited with an Ar ion laser beam (wavelength: 514.5 nm) after exposure to X-rays at 80 KVp, to measure a stimulated emission spectrum. The phosphor was excited with light whose wavelength is varied after exposure to X-rays at 80 KVp, to measure a stimulation spectrum.

The stimulated emission spectrum and stimulation spectrum of said phosphor were the same as those shown in FIGS. 1 and 2, respectively. That is, the phosphor prepared by the process of the present invention gave almost the same stimulated emission spectrum and stimulation spectrum as those of a cerium activated lanthanum oxybromide phosphor prepared by the conventional process.

EXAMPLES 6–8

The procedure of Example 5 was repeated except that 0.41 g. (2% by weight) of each of the following hexafluorosilicic acid compounds was added to 20.0 g. of the heat-treated product of the mixture of starting materials for the phosphor instead of sodium hexafluorosilicate, to obtain a variety of cerium activated lanthanum oxybromide phosphors.

Example 6: magnesium hexafluorosilicate (MgSiF$_6$)
Example 7: calcium hexafluorosilicate (CaSiF$_6$)
Example 8: barium hexafluorosilicate (BaSiF$_6$)

The phosphors prepared in Examples 5 to 8 were excited with an Ar ion laser beam (wavelength: 514.5 nm) after exposure to X-rays at 80 KVp, to measure the luminance of stimulated emission thereof.

Figure 4:
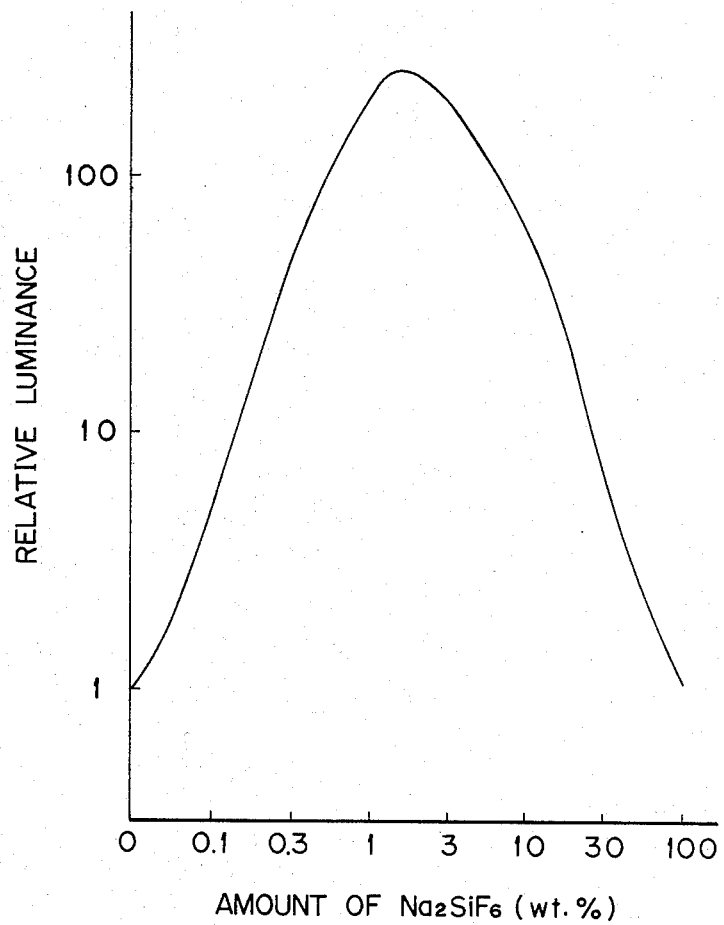
FIG. 4 shows a relationship between an amount of sodium hexafluorosilicate employed in the preparation of a cerium activated lanthanum oxybromide phosphor and luminance of stimulated emission of the obtained phosphor when excited with an Ar ion laser beam (wavelength: 514.5 nm) after exposure to X-rays at 80 KVp.

The results on the evaluation of the phosphors are set forth in Table 4 and FIG. 4. The result on the phosphor of Comparison Example 1 is also set forth in Table 4.

TABLE 4

|  | Hexafluorosilicic Acid Compound | Relative Luminance |
| --- | --- | --- |
| Example 5 | Na$_2$SiF$_6$ | 156 |
| Example 6 | MgSiF$_6$ | 154 |
| Example 7 | CaSiF$_6$ | 69 |
| Example 8 | BaSiF$_6$ | 121 |
| Com. Example 1 | — | 1 |

As is clear from the results set forth in Table 4, the cerium activated lanthanum oxybromide phosphors prepared by adding the hexafluorosilicic acid compounds to the heat-treated product according to the process of the present invention were remarkably enhanced in the luminance of stimulated emission as compared with the phosphor prepared by the conventional process not including the procedure of adding a hexafluorosilicic acid compound.

FIG. 4 shows a relationship between an amount of sodium hexafluorosilicate employed in the preparation of the cerium activated lanthanum oxybromide phosphor and luminance of stimulated emission of the phosphor.

As is clear from the graph shown in FIG. 4, the phosphor prepared by the process of the present invention was remarkably enhanced in the luminance of stimulated emission as compared with the phosphor prepared by the conventional process not including the procedure of adding sodium hexafluorosilicate. Especially, the luminance of stimulated emission of the phosphor reached the level ranging from several tens to one hundred and several tens times of that of the conventional one when the sodium hexafluorosilicate is employed in the amount of 0.3–5% by weight of the heat-treated product.

EXAMPLE 9

The procedure of Example 2 was repeated except that 0.41 g. (2% by weight) of sodium hexafluorosilicate (Na$_2$SiF$_4$) was added to 20.0 g. of the heat-treated product of the mixture of starting materials for the phosphor instead of sodium tetrafluoroborate, to obtain a cerium activated lanthanum oxybromide phosphor.

The phosphor prepared in Example 9 was excited with an Ar ion laser beam (wavelength: 514.5 nm) after exposure to X-rays at 80 KVp, to measure the luminance of stimulated emission thereof.

The result on the evaluation of the phosphor is set forth in Table 5. The result on the phosphor of Comparison Example 2 is also set forth in Table 5.

TABLE 5

| | Na$_2$SiF$_4$ (wt. %) | Relative Luminance |
|---|---|---|
| Example 9 | 2 | 160 |
| Com. Example 2 | 0 | 1 |

As is clear from the results set forth in Table 5, the phosphor prepared by the process of the present invention was remarkably enhanced in the luminance of stimulated emission as compared with the phosphor prepared by the conventional process not including the procedure of adding sodium hexafluorosilicate.

EXAMPLE 10

The procedure of Example 3 was repeated except that 0.41 g. (2% by weight) of sodium hexafluorosilicate (Na$_2$SiF$_4$) was added to 20.0 g. of the heat-treated product of the mixture of starting materials for the phosphor instead of sodium tetrafluoroborate, to obtain a cerium activated lanthanum oxybromide phosphor.

The phosphor prepared in Example 10 was excited with an Ar ion laser beam (wavelength: 514.5 nm) after exposure to X-rays at 80 KVp, to measure the luminance of stimulated emission thereof.

The result on the evaluation of the phosphor is set forth in Table 6. The result on the phosphor of Comparison Example 3 is also set forth in Table 6.

TABLE 6

| | Na$_2$SiF$_4$ (wt. %) | Relative Luminance |
|---|---|---|
| Example 10 | 2 | 170 |
| Com. Example 3 | 0 | 1 |

As is clear from the results set forth in Table 6, the phosphor prepared by the process of the present invention was remarkably enhanced in the luminance of stimulated emission as compared with the phosphor prepared by the conventional process not including the procedure of adding sodium hexafluorosilicate.

EXAMPLE 11

The procedure of Example 1 was repeated except that 0.61 g. (3% by weight) of magnesium fluoride (MgF$_2$) was added to 20.0 g. of the heat-treated product of the mixture of starting materials for the phosphor instead of sodium tetrafluoroborate, to obtain a cerium activated lanthanum oxybromide phosphor.

Further, the same procedure was repeated except that the amount of magnesium fluoride to be added was varied within the range of 0.1–100% by weight to the amount of the heat-treated product, to obtain a variety of cerium activated lanthanum oxybromide phosphors.

The phosphor prepared in Example 11, that is, a cerium activated lanthanum oxybromide phosphor obtained by adding 3% by weight of magnesium fluoride was excited with an Ar ion laser beam (wavelength: 514.5 nm) after exposure to X-rays at 80 KVp, to measure a stimulated emission spectrum. The phosphor was excited with light whose wavelength is varied after exposure to X-rays at 80 KVp, to measure a stimulation spectrum.

The stimulated emission spectrum and stimulation spectrum of said phosphor were the same as those shown in FIGS. 1 and 2, respectively. That is, the phosphor prepared by the process of the present invention gave almost the same stimulated emission spectrum and stimulation spectrum as those of a cerium activated lanthanum oxybromide phosphor prepared by the conventional process.

EXAMPLES 12–19

The procedure of Example 11 was repeated except that 0.61 g. (3% by weight) of each of the following metal fluorides was added to 20.0 g. of the heat-treated product of the mixture of starting materials for the phosphor instead of magnesium fluoride, to obtain a variety of cerium activated lanthanum oxybromide phosphors.

Example 12: lithium fluoride (LiF)
Example 13: sodium fluoride (NaF)
Example 14: calcium fluoride (CaF$_2$)
Example 15: strontium fluoride (SrF$_2$)
Example 16: barium fluoride (BaF$_2$)
Example 17: zinc fluoride (ZnF$_2$.4H$_2$O)
Example 18: manganese fluoride (MnF$_2$)
Example 19: lead fluoride (PbF$_2$)

The phosphors prepared in Examples 11 to 19 were excited with an Ar ion laser beam (wavelength: 514.5 nm) after exposure to X-rays at 80 KVp, to measure the luminance of stimulated emission thereof.

Figure 5:
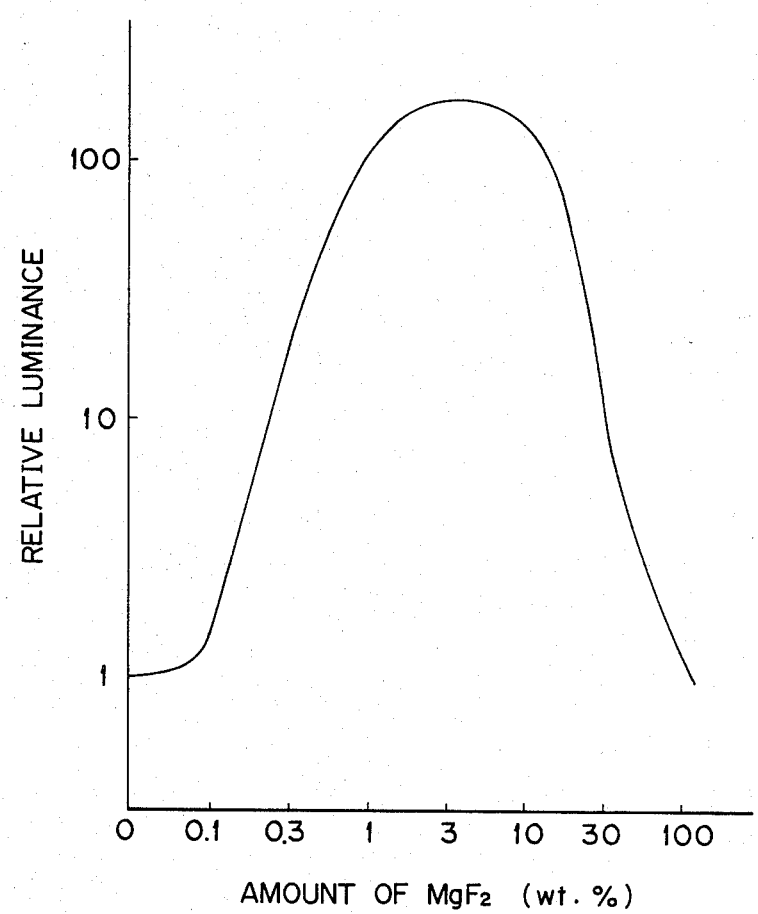
FIG. 5 shows a relationship between an amount of magnesium fluoride employed in the preparation of a cerium activated lanthanum oxybromide phosphor and luminance of stimulated emission of the obtained phosphor when excited with an Ar ion laser beam (wavelength: 514.5 nm) after exposure to X-rays at 80 KVp.

The results on the evaluation of the phosphors are set forth in Table 7 and FIG. 5. The result on the phosphor of Comparison Example 1 is also set forth in Table 7.

TABLE 7

| | Metal Fluoride | Relative Luminance |
|---|---|---|
| Example 11 | MgF$_4$ | 170 |
| 12 | LiF | 80 |
| 13 | NaF | 15 |
| 14 | CaF$_2$ | 12 |
| 15 | SrF$_2$ | 10 |
| 16 | BaF$_2$ | 6 |
| 17 | ZnF$_2$.4H$_2$O | 8 |
| 18 | MnF$_2$ | 6 |
| 19 | PbF$_2$ | 6 |
| Com. Example 1 | — | 1 |

As is clear from the results set forth in Table 7, the cerium activated lanthanum oxybromide phosphors prepared by adding the metal fluorides to the heat-treated product according to the process of the present invention were remarkably enhanced in the luminance of stimulated emission as compared with the phosphor prepared by the conventional process not including the procedure of adding metal fluoride.

FIG. 5 shows a relationship between an amount of magnesium fluoride employed in the preparation of the cerium activated lanthanum oxybromide phosphor and luminance of stimulated emission of the phosphor.

As is clear from the graph shown in FIG. 5, the phosphor prepared by the process of the present invention was remarkably enhanced in the luminance of stimulated emission as compared with the phosphor prepared by the conventional process not including the procedure of adding magnesium fluoride. Especially, the luminance of stimulated emission of the phosphor reached the level ranging from several tens to one hundred times of that of the conventional one when the magnesium fluoride was employed in the amount of 0.5–20% by weight of the heat-treated product.

EXAMPLE 20

The procedure of Example 2 was repeated except that 0.61 g. (3% by weight) of magnesium fluoride ($MgF_2$) was added to 20.0 g. of the heat-treated product of the mixture of starting materials for the phosphor instead of sodium tetrafluoroborate, to obtain a cerium activated lanthanum oxybromide phosphor.

The phosphor prepared in Example 20 was excited with an Ar ion laser beam (wavelength: 514.5 nm) after exposure to X-rays at 80 KVp, to measure the luminance of stimulated emission thereof.

The result on the evaluation of the phosphor is set forth in Table 8. The result on the phosphor of Comparison Example 2 is also set forth in Table 8.

TABLE 8

|  | $MgF_2$ (wt. %) | Relative Luminance |
|---|---|---|
| Example 20 | 3 | 200 |
| Com. Example 1 | 0 | 1 |

As is clear from the results set forth in Table 8, the phosphor prepared by the process of the present invention was remarkably enhanced in the luminance of stimulated emission as compared with the phosphor prepared by the conventional process not including the procedure of adding magnesium fluoride.

EXAMPLE 21

The procedure of Example 3 was repeated except that 0.61 g. (3% by weight) of magnesium fluoroide ($MgF_2$) was added to 20.0 g. of the heat-treated product of the mixture of starting materials for the phosphor instead of sodium tetrafluoroborate, to obtain a cerium activated lanthanum oxybromide phosphor.

The phosphor prepared in Example 21 was excited with an Ar ion laser beam (wavelength: 514.5 nm) after exposure to X-rays at 80 KVp, to measure the luminance of stimulated emission thereof.

The result on the evaluation of the phosphor is set forth in Table 9. The result on the phosphor of Comparison Example 3 is also set forth in Table 9.

TABLE 9

|  | $MgF_2$ (wt. %) | Relative Luminance |
|---|---|---|
| Example 21 | 3 | 220 |
| Com. Example 8 | 0 | 1 |

As is clear from the results set forth in Table 9, the phosphor prepared by the process of the present invention was remarkably enhanced in the luminance of stimulated emission as compared with the phosphor prepared by the conventional process not including the procedure of adding magnesium fluoride.

We claim:

1. A process for the preparation of a cerium activated rare earth oxyhalide phosphor having the following formula:

in which Ln is at least one rare earth element selected from the group consisting of Y, La, Gd and Lu; X is at least one halogen selected from the group consisting of Cl, Br and I; and x is a number satisfying the condition of $0 < x \leq 0.1$, which comprises:

adding to a mixture of starting materials for the phosphor or a heat-treated product of said mixture the heat treatment being effected at 300° to 500° C. at least one compound selected from the group consisting of tetrafluoroboric acid compounds, hexafluorosilicic acid compounds and metal fluorides in an amount of not more than 100% by weight per the amount of said mixture or said heat-treated product thereof to mix them; and firing the so obtained mixture at a temperature of from 900° to 1500° C., wherein said at least one compound is present in an amount sufficient to effect a cerium activated rare earth oxyhalide phosphor having the above formula, exhibiting a higher luminance of stimulated emission upon excitation with an electromagnetic wave having a wavelength within the region of 450 to 900 nm after exposure to X-ray radiation, than said phosphor prepared as above, absent said compound.

2. The process as claimed in claim 1, in which said compound is at least one tetrafluoroboric acid compound.

3. The process as claimed in claim 2, in which said tetrafluoroboric acid compound is added in an amount of 0.1–30% by weight per the amount of said mixture of starting materials or said heat-treated product thereof.

4. The process as claimed in claim 3, in which said tetrafluoroboric acid compound is added in an amount of 0.3–5% by weight per the amount of said mixture of starting materials or said heat-treated product thereof.

5. The process as claimed in claim 2, in which said tetrafluoroboric acid compound is at least one compound selected from the group consisting of $NaBF_4$, $KBF_4$, $NH_4BF_4$, $Mg(BF_4)_2$, $Ca(BF_4)_2$, $Sr(BF_4)_2$ and $Ba(BF_4)_2$.

6. The process as claimed in claim 5, in which said tetrafluoroboric acid compound is at least one compound selected from the group consisting of $NaBF_4$, $KBF_4$ and $NH_4BF_4$.

7. The process as claimed in claim 6, in which said tetrafluoroboric acid compound is $NaBF_4$.

8. The process as claimed in claim 1, in which said compound is at least one hexafluorosilicic acid compound.

9. The process as claimed in claim 8, in which said hexafluorosilicic acid compound is added in an amount of 0.1–30% by weight per the amount of said mixture of starting materials or said heat-treated product thereof.

10. The process as claimed in claim 9, in which said hexafluorosilicic acid compound is added in an amount of 0.3–5% by weight per the amount of said mixture of starting materials or said heat-treated product thereof.

11. The process as claimed in claim 8, in which said hexafluorosilicic acid compound is at least one compound selected from the group consisting of $Li_2SiF_6$, $Na_2SiF_6$, $K_2SiF_6$, $Rb_2SiF_6$, $Cs_2SiF_6$, $(NH_4)_2SiF_6$, $MgSiF_6$, $CaSiF_6$, $BaSiF_6$, $CuSiF_6$, $ZnSiF_6$ and $PbSiF_6$.

12. The process as claimed in claim 11, in which said hexafluorosilicic acid compound is at least one compound selected from the group consisting of $Na_2SiF_6$, $MgSiF_6$, $CaSiF_6$ and $BaSiF_6$.

13. The process as claimed in claim 12, in which said hexafluorosilicic acid compound is at least one compound selected from the group consisting of $Na_2SiF_6$ and $MgSiF_6$.

14. The process as claimed in claim 1, in which said compound is at least one metal fluoride.

15. The process as claimed in claim 14, in which said metal fluoride is added in an amount of 0.2–30% by weight per the amount of said mixture of starting materials or said heat-treated product thereof.

16. The process as claimed in claim 15, in which said metal fluoride is added in an amount of 0.5–20% by weight per the amount of said mixture of starting materials or said heat-treated product thereof.

17. The process as claimed in claim 14, in which said metal fluoride is at least one compound selected from the group consisting of monovalent metal fluorides and divalent metal fluorides.

18. The process as claimed in claim 17, in which said metal fluoride is at least one compound selected from the group consisting of LiF, NaF, KF, RbF, CsF, $MgF_2$, $CaF_2$, $SrF_2$, $BaF_2$, $CuF_2$, $ZnF_2$, $MnF_2$ and $PbF_2$.

19. The process as claimed in claim 18, in which said metal fluoride is at least one compound selected from the group consisting of LiF, NaF, $MgF_2$, $CaF_2$, $SrF_2$, $BaF_2$, $ZnF_2$, $MnF_2$ and $PbF_2$.

20. The process as claimed in claim 19, in which said metal fluoride is at least one compound selected from the group consisting of LiF and $MgF_2$.

21. The process as claimed in claim 1, in which Ln in the formula is at least one rare earth element selected from the group consisting of La and Gd.

22. The process as claimed in claim 1, in which X in the formula is Br.

* * * * *